March 3, 1970     D. R. FROSOLONE     3,498,464
KNOCK-DOWN FILTER
Filed Aug. 28, 1968
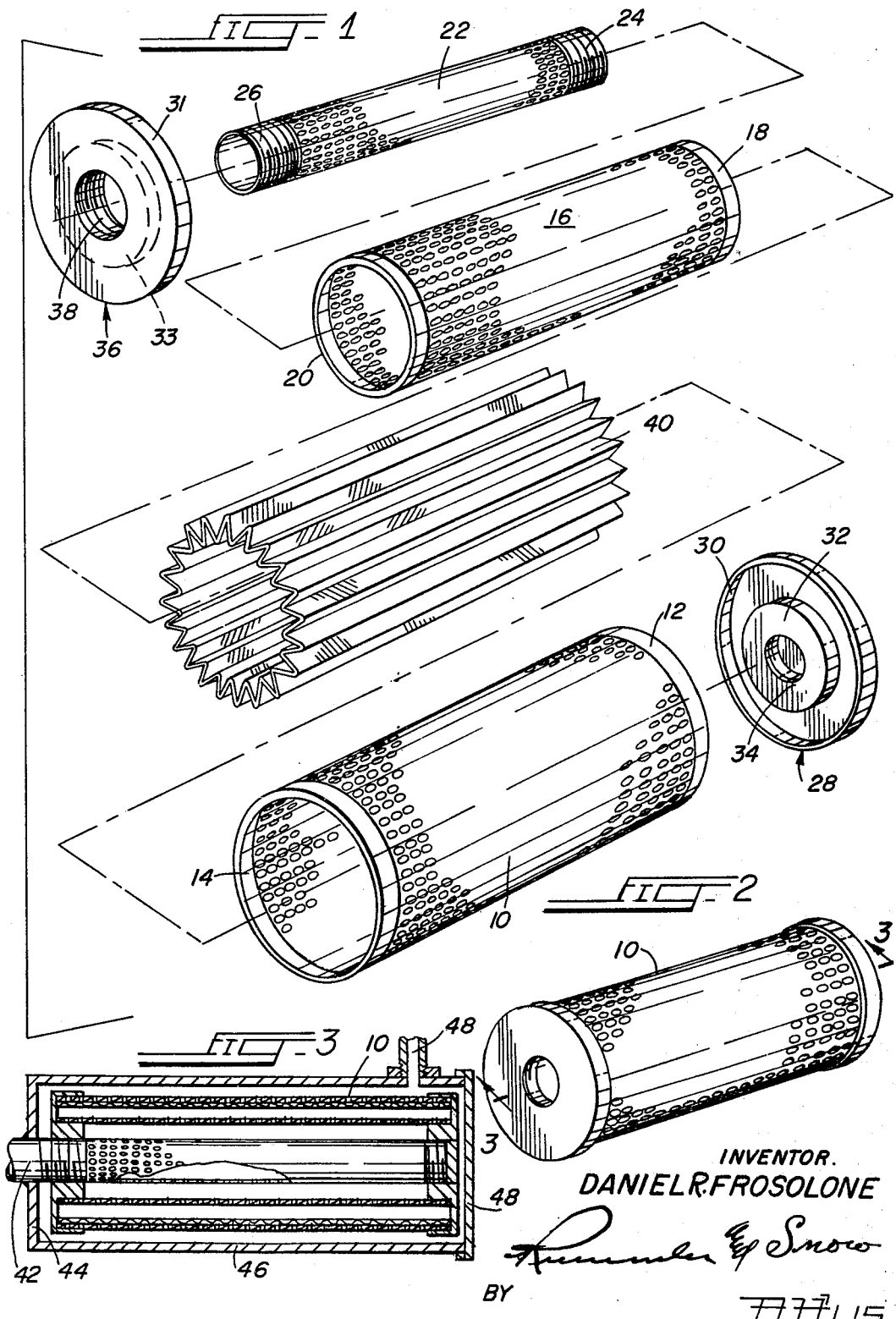
INVENTOR.
DANIEL R. FROSOLONE
BY
ATTYS.

United States Patent Office 3,498,464
Patented Mar. 3, 1970

3,498,464
KNOCK-DOWN FILTER
Daniel R. Frosolone, 5815 N. Cicero Ave.,
Chicago, Ill. 60646
Filed Aug. 28, 1968, Ser. No. 755,946
Int. Cl. B01d 25/04, 27/06
U.S. Cl. 210—457      1 Claim

ABSTRACT OF THE DISCLOSURE

A filter cartridge for filtering out particulate matter in used solvents such as perchloroethylene, used in dry cleaning systems, of knockdown construction for ready replacement and reuse having interfitted perforated tubes, one within the other and having a tubular element of folded accordion pleated filter paper all in a compact unit all anchored together by cover and bottom plates.

BACKGROUND OF INVENTION

In coin operated self service dry cleaning establishments a filter cartridge is employed in interceptor relationship with a system for use in cleaning solvents from a dry cleaning machine whereby the solvents may be used over and over again with all particulate matter removed. These filters are very expensive, running about $180.00 per year for each machine in an establishment. Most coin self operated dry cleaning establishments have a minimum of 10 machines thus costing the operator about $1,800.00 a year for filter cartridges. These figures are based on a normal busy establishment wherein 60 loads of solvent are used every 13 days per machine.

The known prior art found in a search includes Patent Nos. 2,557,557; 3,178,025; 3,189,179; 3,262,563 and 3,263,812. All of these patents as relates to one use filter cartridges for dry cleaning solvents and are of the throw away kind. None are knock-down and reusable.

SUMMARY OF THE INVENTION

This invention involves the provision of a knock-down, reusable multi-stage filter unit which is disposed in the path of a circulating solvent for removing particulate matter therefrom wherein three different sized perforated metal tubes are nested and held together by a removable cap or cover plate and a bottom cap or cover which is axially threaded for attachment to the system piping. A filter paper tube is also nested between two of the tubes. The entire cartridge is contained in a hollow housing and into which housing the used solvent enters for filtering before entering the rest of the system.

BRIEF DESCRIPTION OF THE DRAWINGS

FIGURE 1 is an exploded perspective view of the disposable filter cartridge of this invention.

FIGURE 2 is a perspective view of the assembled cartridge.

FIGURE 3 is a cross sectional view taken on the line 3—3 of FIG. 2 of the filter cartridge and also shows the receiving tank in horizontal cross section into which the cartridge is housed.

DESCRIPTION OF THE PREFERRED EMBODIMENT

The collapsible or knock-down cartridge comprises three different diameter tubular perforated cylindrical shells or tubes. The outer shell or tube 10 is perforated all over its surface, with each aperture approximating 7/16 inch. The shell 10 is provided with bands 12 and 14. The diameter of the shell approximates 7½ inches.

The intermediate perforated cylindrical shell or tube 16 is perforated all over its surface, with each aperture approximating 3/32 of an inch. The shell 20 is provided with imperforate ends 18 and 20. The diameter of the shell 16 approximates 3½ inches.

The inner cylindrical shell or tube 22 is perforated all over with each aperture approximating 3/32 if an inch. The shell 22 approximates 1½ inches in diameter. Short threaded pipe nipples 24 and 26 are welded at the distal ends of the shell 22.

The cap or cover plate is provided with a peripheral inwardly extending flange 30 of a size to snugly seat around the band 12 of the shell 10. The cap is also provided with collar 32 having an axial threaded bore 34 for the reception of the threaded nipple 24 of the cylinder 22. The collar 32 is welded to the inner surface of the cap and axially thereof. The collar 32 is of a diameter to snugly receive and seat within the interior of the band 18 of the tube 16.

The other end cap or cover plate 36 is constructed identically as cap 30 with the exception that the bore 38 extends through the cap 36 and is threaded throughout its length.

The accordion pleated filter paper 40 is generally of tubular shape and of a length equal to the length of cylinders 10 and 16 and nests therebetween when the cartridge is assembled.

The metal cylinders 10, 16 and 22 are approximately 13½ inches in length and are constructed out of approximately 18 gauge sheet steel.

In assembling the cartridge the threaded nipple 26 of the inner tube 22 is partially threaded into the bore 38. The band 20 of tube 16 is pressure fitted around collar 33 of cap 36. The band 14 of tube 10 is then pressure fitted interiorly of the flange 31 of the cap 36.

The filter paper tube 40 is now positioned between tubes 10 and 16.

The cover cap 28 is secured to the cartridge by the threaded engagement of threads 34 and 24 of tube 22 by rotating the cap 28 clockwise. Such rotation draws the cap inwardly to make snug all pressure fit connections, that is, the interior of band 12 around the outer surface of collar 32, and the interior surface of flange 30 around the exterior surface of band 12, and cause all the ends of the tubes 10, 16 and 22 to bear against the inside faces of the caps 28 and 36 as should be obvious. Also the distal ends of the filter paper will likewise bear against the inner faces of caps 28 and 36.

In use the remainder of threads 38 in bore 36 are mated in threaded engagement with the outlet pipe 42 which pipe is welded axially to end wall 44 of a used solvent receiving tank 46 so that the filter lies in long axis of the tank. When the solvent is pumped from a dry cleaning machine the solvent flows through conduit 48 secured to the wall 46 of the tank, but at a point which is at a distance away from that of the outlet pipe 42. Thus solvent entering tank 46 is under pressure of about 25 p.s.i. The receiving tank 46 is provided with pressure sealed removable end cap 48.

All particulate matter such as dirt, lint, hair etc. will be trapped by the filter cartridge and only clean uncontaminated solvent will pass out of the outlet pipe 42.

To reuse the cartridge, it is removed from the tank and the caps or cover plates are removed, the filter paper tube 40 discarded and the tubes brushed out to remove any particulate matter. The tubes are reassembled again as described hereinabove and the cartridge is ready for reuse.

It should be understood that the end of the pipe, now disclosed as having the threads 26, may be welded to the bore 38 instead of having a threaded connection thereto.

Although but one specific embodiment is herein shown and described, it is to be understood that numerous details may be changed, altered or omitted without the departing from the spirit of this invention.

I claim:
1. A knock-down multistage reusable cartridge for use in a dry cleaning machine system wherein used solvent is passed therethrough to remove particulate matter therefrom whereby the solvent may be reused, comprising a bottom cap having an inner surface, and bored axially, a collar axially bored and threaded and integrally secured axially to the inner surface of said cap, a peripheral flange on said cap extending in the same plane as said collar, an inner tube having a diameter of approximately one and one-half inches, perforated all over, with each aperture having a diameter of approximately three-thirty seconds inch, and having threaded ends, one end secured to said collar and in said bore, an intermediate tube having a diameter of three and one-half inches, perforated all over, each aperture having a diameter of approximately three-thirty seconds inch, one end of said tube frictionally seated around the periphery of said collar, an outer tube having a diameter of substantially seven and one-half inches, perforated all over, each aperture having a diameter of substantially seven-sixteenths inch, and frictionally seated against the inner surface of said flange, an accordion pleated filter paper tube loosely seated between said intermediate and outer tubes and of a length substantially equal to the length of said outer and intermediate tubes, a cover cap having an inner face with a peripheral flange extending inwardly therefrom, a collar integrally fastened axially to the inner face of said cover cap, and having an axial threaded bore therein for cooperative engagement with the other end of said inner tube to draw the cartridge together into a unitary structure, the free ends of said intermediate and outer tubes cooperatively engaged by the periphery of said last named collar and the inside surface of said last named flange.

References Cited

UNITED STATES PATENTS

| 619,569 | 2/1899 | Hewel | 210—489 X |
| 945,632 | 1/1910 | Strahl | 210—489 X |
| 2,413,991 | 1/1947 | Newman | 210—457 |
| 2,464,036 | 3/1949 | Hasselwander | 210—493 X |
| 2,627,350 | 2/1953 | Wicks | 210—458 |
| 2,730,241 | 1/1956 | Thomas | 210—493 X |
| 2,953,249 | 9/1960 | Topol et al. | 210—315 X |
| 3,189,179 | 6/1965 | McMichael | 210—493 X |
| 3,246,765 | 4/1966 | Murphy et al. | 210—493 X |
| 3,312,349 | 4/1967 | Rosaen | 210—315 X |

FOREIGN PATENTS 530,116 12/1940 Great Britain.

REUBEN FRIEDMAN, Primary Examiner

C. M. DITLOW, Assistant Examiner

U.S. Cl. X.R.

210—461, 487, 489, 493